Aug. 10, 1954   O. E. SORENSEN   2,685,735
PINKING SHEARS HAVING LINEAR BLADE
CONTACT WITH PLANAR RAKE
Filed Nov. 29, 1946   5 Sheets-Sheet 1
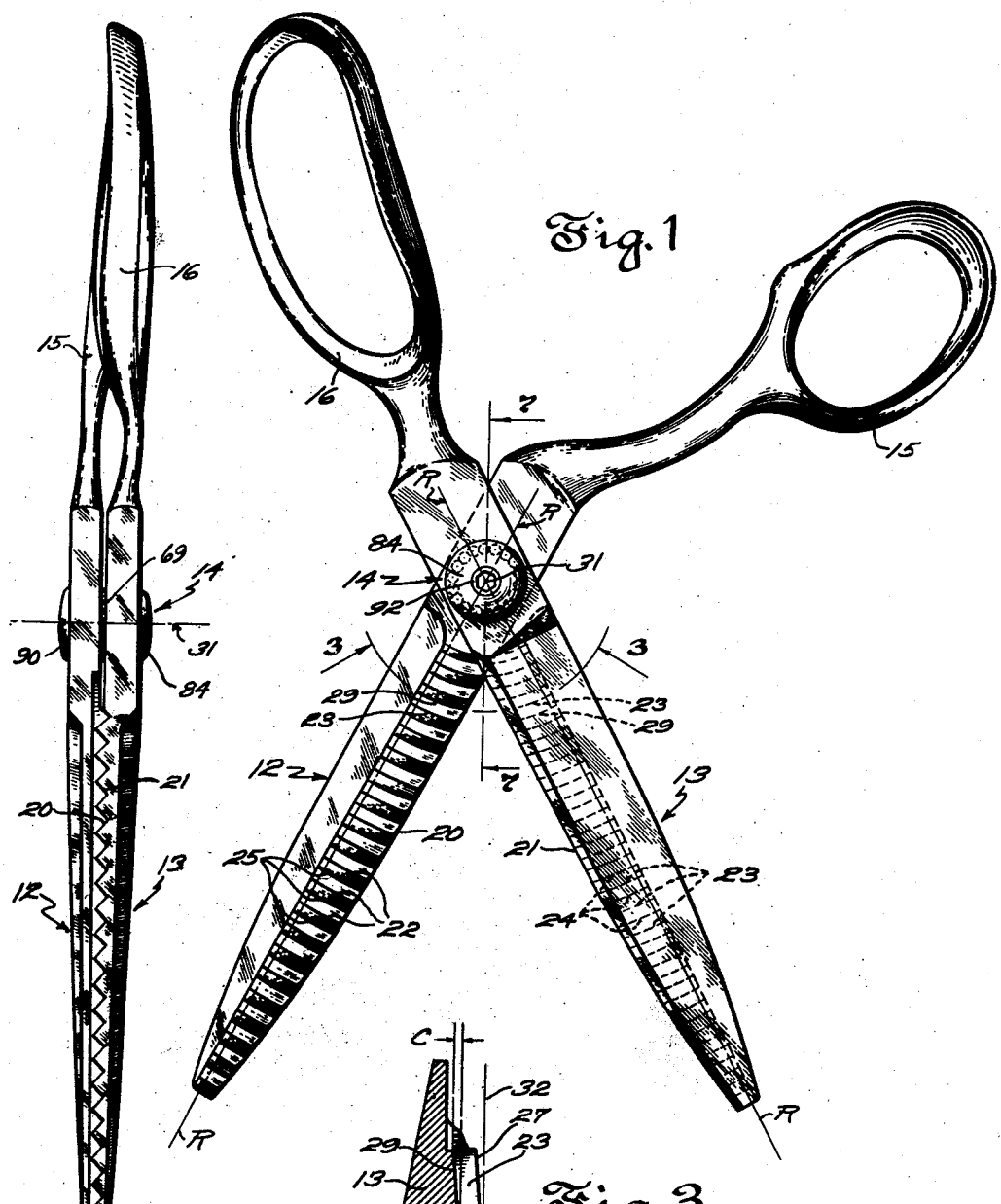
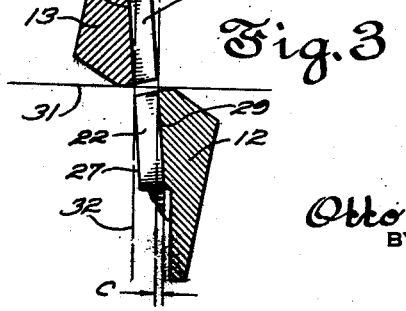
INVENTOR
Otto E. Sorensen
BY
ATTORNEY

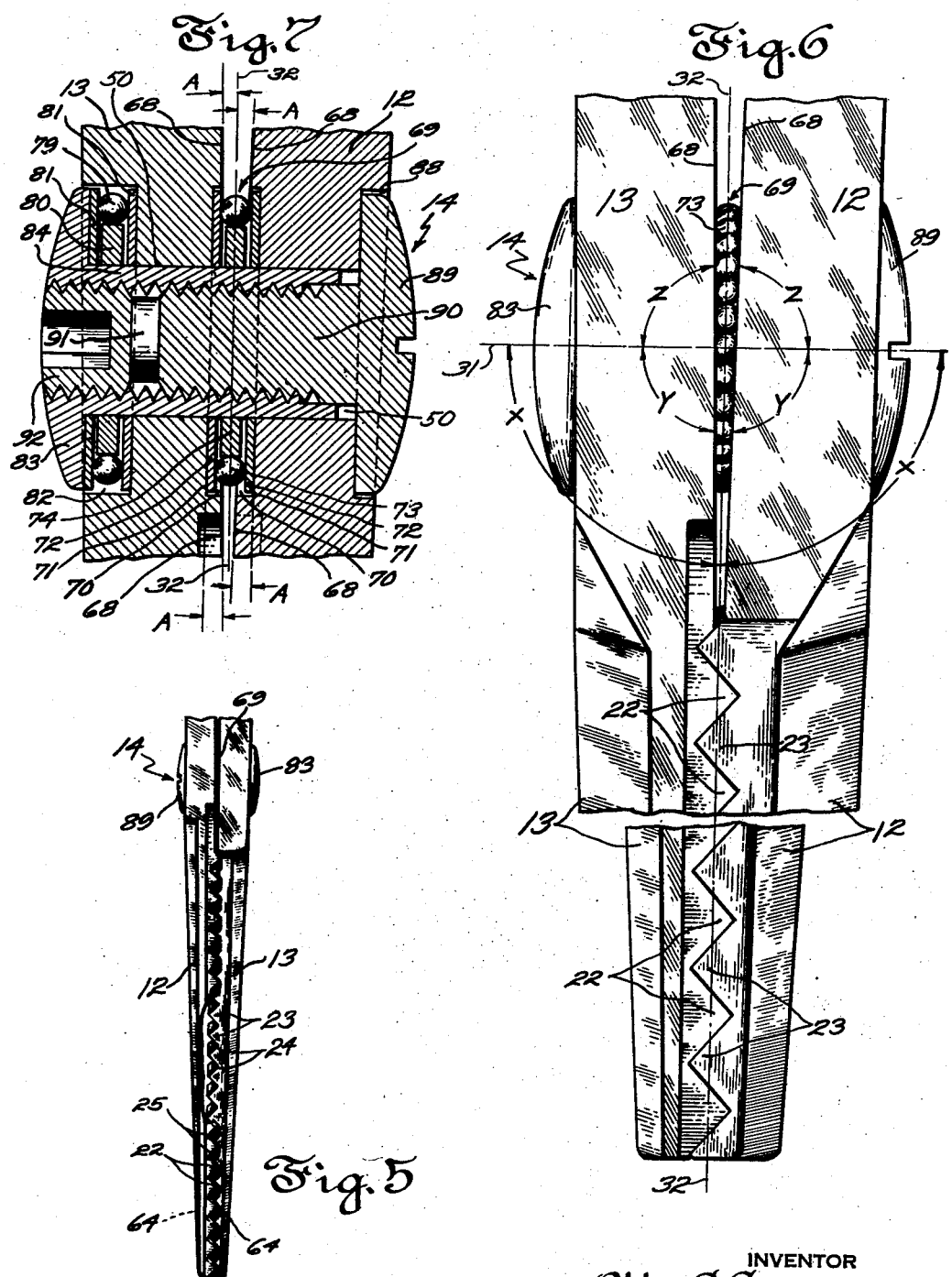

Aug. 10, 1954

O. E. SORENSEN 2,685,735

PINKING SHEARS HAVING LINEAR BLADE
CONTACT WITH PLANAR RAKE

Filed Nov. 29, 1946

INVENTOR
Otto E. Sorensen,
BY
ATTORNEY

Aug. 10, 1954
O. E. SORENSEN
2,685,735
PINKING SHEARS HAVING LINEAR BLADE
CONTACT WITH PLANAR RAKE
Filed Nov. 29, 1946
5 Sheets-Sheet 5
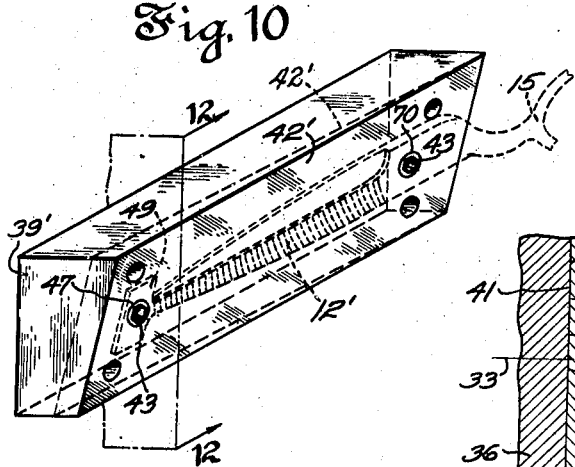
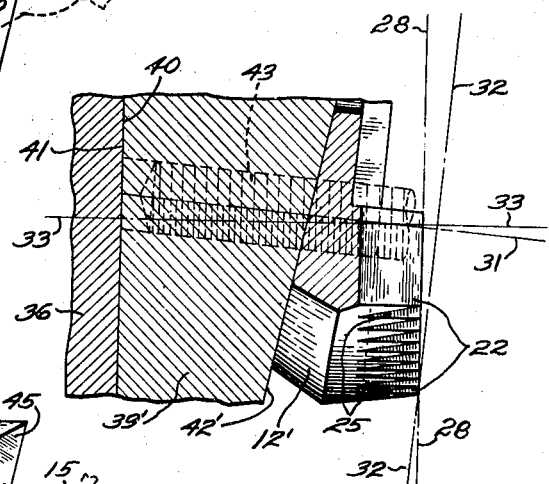
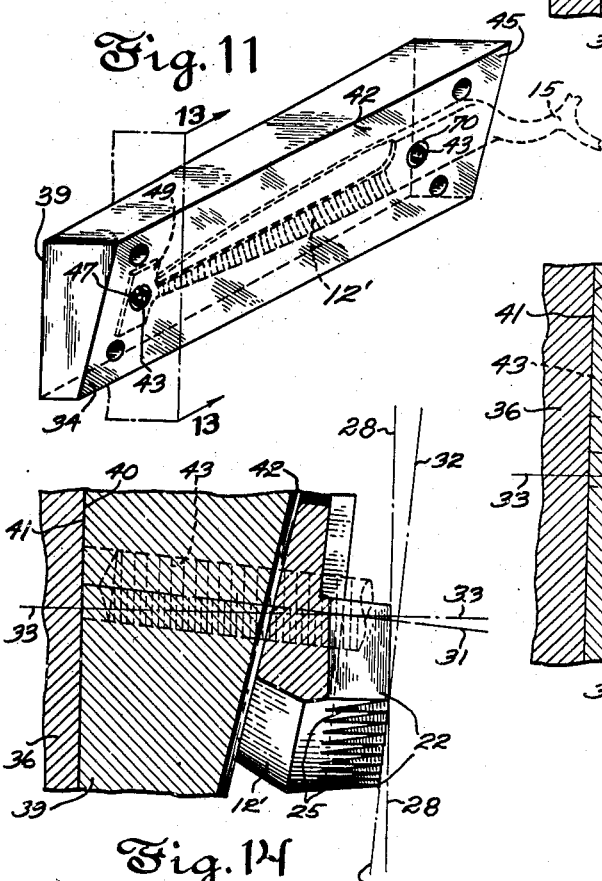
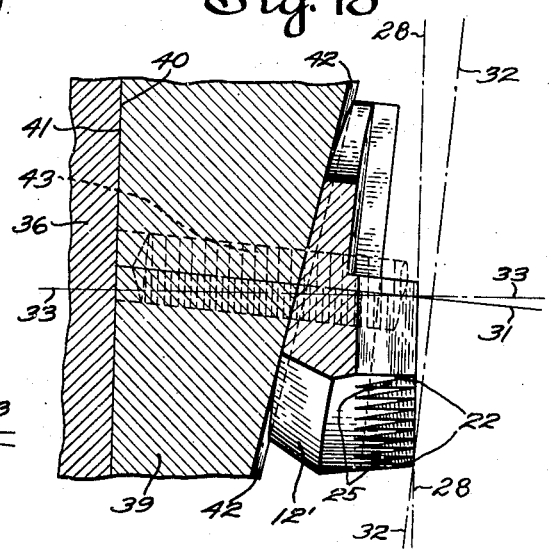
INVENTOR
Otto E. Sorensen,
BY
ATTORNEY

Patented Aug. 10, 1954

2,685,735

UNITED STATES PATENT OFFICE 2,685,735

PINKING SHEARS HAVING LINEAR BLADE CONTACT WITH PLANAR RAKE

Otto E. Sorensen, Fairfield, Conn.

Application November 29, 1946, Serial No. 712,774

2 Claims. (Cl. 30—230)

This invention relates to improvements in the construction of pinking shears.

In the manufacture of pinking shears a finishing operation is usually resorted to which consists in lapping the "zig-zag" cutting edge of one swinging shear blade against the substantially conforming zig-zag cutting edge of the mating shear blade for producing exact conformity of fit of these cooperative cutting edges in their regions which first meet as the shears are being closed. As heretofore performed this lapping operation has produced a lapped area of one blade surface which in the work cutting operation of the shears rubs slidingly in contact with a correspondingly lapped area of the mating blade surface in those margins of the blade that are adjacent their cutting edges as such margins swing past each other. The presence of such areas of sliding contact between relatively swinging blade margins having no rake nor cutting "clearance" militates against a satisfactory cutting performance. In particular it tends to drag in between the mutually contacting lapped blade areas shreds of thin or compressible materials instead of cleanly severing the material.

Former attempts to solve this problem have proven unsatisfactory. There have been proposals to reduce the extent of the mutually contacting area of the lapped blade surfaces in the direction of shearing motion of the blades by undercutting or beveling only a portion of the mutually facing blade surfaces in a manner to produce rake or clearance. This expedient has caused the blades to lose their cutting edges entirely when ground down as in the common method of resharpening shears and has necessitated the inconvenient practice of sending pinking shears back to the factory for resharpening. There have also been proposals to mount each of the initially lapped blade edges in a shifted position in the assembled shear so that in work cutting relationship they are displaced eccentrically from the pivotal center about which the blade edges were originally swung in lapping them into a conforming fit. This can produce at best but an infinitesimal degree of rake or cutting clearance and it furthermore disturbs the exactness of register into which the cutting edges were mutually lapped before being assembled into shears ready for use. All of these expedients have been found detrimental to good cutting performance.

In contrast to such unsatisfactory expedients, the present improvements aim to produce pinking shear blades having, after they are ultimately assembled in the completed shears, exactly registering zig-zig cutting edges and ribbed mutually facing surfaces terminating at such cutting edges which are lapped throughout but which are free in the work cutting action of the shears from areal rubbing contact throughout the whole of their ribbed surface conformation. The blades by means of the present invention are so cooperatively shaped and relatively positioned that no areal portion of their lapped faces rub together in passing during the blade action in the assembled shears. In other words, my improved blades make contact only of linear nature and solely at the extremity of their cutting edges. They have no areal rubbing contact at all in the margins of the blades adjacent the linear cutting edges. Thus the highly desirable condition is attained that the entire area of the ribbed surface of each blade is given rake or cutting clearance with respect to the entire area of the ribbed surface of the other blade without when assembling the blades displacing the cutting edge of either blade from that exact relationship to the pivotal center about which it was swung when it was lapped against the other blade during fabrication.

It is further an object of these improvements to couple together by improved pivotal construction shear blades fabricated and configured according to this invention with the object of improving the ease of blade action in the assembled shears and the efficiency of cutting performance.

A contributory object is to attain in the assembled shears a sufficient progressively occurring pressure of the entire length of cutting edge of each blade against the entire length of cutting edge of the other blade without giving rise to undesirable frictional resistance that would tire the hand of the operator in long continuous use of the shears and without giving rise to jerkiness in the blade action that will detract from the smoothness and accuracy with which the shears are capable of following an intended pattern line along the material being cut.

A related object is to enable the force with which the shear blades press against each other in the cutting action to be regulated easily to any degree chosen by the user.

The foregoing and still other objects of the invention will appear in greater particular in the following description of actual construction by which the present invention may be embodied in pinking shears and practiced in the art of manufacturing them. Reference is had in the following to the figures of the appended drawings wherein:

Fig. 1 is a sidewise view of pinking shears embodying the present invention.

Fig. 2 is an edgewise view looking from the left at Fig. 1 with the shear blades closed in laterally sprung condition to insure firm contacting at their tips.

Fig. 3 is an enlarged view taken in section through the pivotally connected blades on the arcuate line 3—3 in Fig. 1 looking radially toward the common pivotal axis of the blades.

Fig. 5 is a view similar to a portion of Fig. 2 showing the blades in unsprung condition when the shears are fully open as in Fig. 1.

Fig. 6 is an enlarged view similar to Fig. 2 showing the shear blades in contracted length with handles omitted.

Fig. 7 is a view drawn on the same scale as Fig. 6 taken in section on the plane 7—7 in Fig. 1 looking in the direction of the arrows.

Fig. 10 shows a modification of the shape of the block on which the blade blank is shown to be mounted in Fig. 8, explanative of reasons for shaping the latter as in Fig. 11.

Fig. 11 shows the actual block on which the blade block is mounted in Fig. 8 removed from the face plate of the lathe.

Fig. 12 is an enlarged view taken in section through the blade blank and its holding block on the plane 12—12 in Fig. 10 looking in a direction parallel with the face plate of the lathe in Fig. 8 as indicated by the arrows.

Fig. 13 is a view comparable with Fig. 12 taken in section on the plane 13—13 in Fig. 11.

Fig. 14 is a view showing the blade blank of Fig. 13 restored to a position of conformity with the sloping face of the modified holding block of Fig. 10 after the ribbed surface has been cut in the blade blank.

Figure 4:
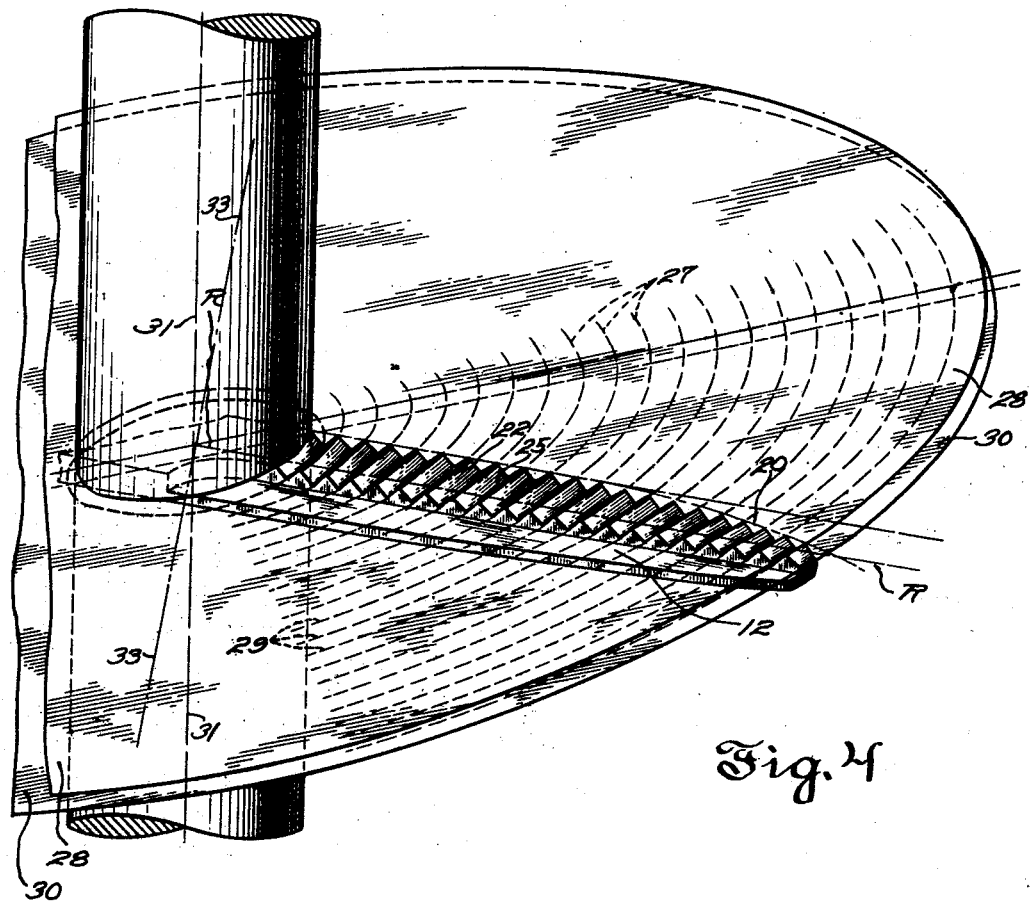
Fig. 4 is a diagrammatic view of hypothetical planes and of the geometrical relationship of same to one of the blades and to the pivotal axis of the shears.

In the drawings blades of hand operated pinking shears incorporating the present invention are designated 12 and 13. The blades are coupled together in a manner to swing relatively to each other about a pivot structure generally designated 14 whose details are hereinafter fully explained. Blade 12 has the loop handle 15 receptive to the operator's thumb while blade 13 has the loop handle 16 suited to receive three of the operator's fingers.

The blades 12 and 13 have cooperative zig-zag linear cutting edges 20 and 21, respectively, which constitute the endwise extremities of side-by-side alternating ridges and grooves constituting mutually facing grooved surfaces of the blades. The ridges 22 of blade 12 mate respectively with grooves 24 of blade 13 while the ridges 23 of blade 13 mate respectively with the grooves 25 of blade 12. Ridges and grooves of the same blade conform to coaxial circumferential arcs, the common axis of same being represented by line 32 in Fig. 4.

As will be clear from Fig. 4 and from the hereinafter explained manner of cutting the ridges, the crest lines 27 of all ridges in a single blade lie continuously in and are confined to a common reference plane designated 28 in Fig. 4 while the basal or trough lines 29 of all grooves in a single blade lie continuously in and are confined to a different common reference plane 30 that is parallel with reference plane 28. According to the present invention the said crests and troughs of the ridges and grooves occupy their said respective reference planes through their entire length from one endwise extremity to the other endwise extremity of each ridge or groove, but as will later appear each such reference plane, in the case of each blade, is inclined rather than perpendicular relative to the common axis 31 about which both blades of the assembled shears swing in their work shearing relative motion. This is evident from Fig. 4. In other words, the planar course traversed by a tool as in Fig. 8, and which cuts grooves 24 and 25 from the blade blank, diverges from perpendicular relation to the common axis 31 of pivot 14 about which both blades swing in the use of the shears, but such tool course is perpendicular to the blade tooth machining axis 32.

Figure 8:
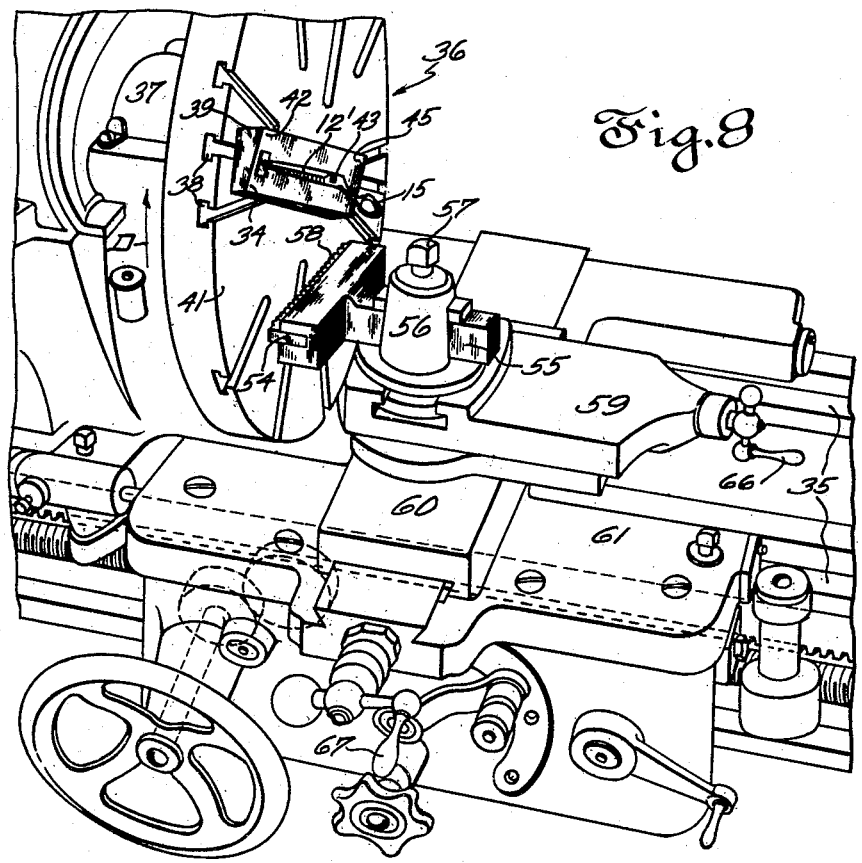
Fig. 8 shows a practical machine tool set-up for generating the ribbed surfaces of the blades.

In practice, ridges and grooves of this disposition may be generated in devious ways. They might be die cast, but for purpose of illustration Fig. 8 shows one example of a machine tool set-up that is available to any moderately equipped machine shop and capable of producing pinking shears having blades incorporating the present improvements. In Fig. 8, 35 represents the ways of a conventional lathe whose power rotated face plate 36 is driven by a lathe spindle (not shown) that is journaled in the head stock spindle bearing 37 to turn about a fixed axis of rotation 33. By any well known means a work holding block 39 may be clamped firmly against face plate 36 to revolve in unison therewith about axis 33. Such means may include ordinary work clamping straps (not shown) whose fastening bolts (not shown) may penetrate the slots 38 in face plate 36 and engage nuts (not shown) at the rear thereof to draw such straps against block 39. The flat face 40 of block 39 is understood to lie directly against the vertical flat face 41 of the face plate.

The blade blank 12' is shown set up in Fig. 8 for machining by being clamped firmly against a work holding face 42 of block 39 that is slanted both crosswise and lengthwise of the latter. This work holding face in Fig. 10 is shown in modified form, for the purposes of illustrating a problem that arises, as slanted only crosswise the width of the block as indicated at 42'. The amount of slant is exaggerated in the drawings for the purpose of more clearly illustrating certain geometrical principles involved. The blade blank may be clamped fixedly into slanting conformity with block surface 42 by means of socket type, fastening screws 43 which thread into block 39 and whose holding heads are sunk flush in counterbores 47 and 76, respectively, in the blade blank. The blank includes a temporary lug formation 49 containing counterbore 47 which lug will be removed after the ribbed surface of the blade has been generated. After this lug 49 will be cut off and the blade tips will be pointed bluntly as in Figs. 1 and 4.

A gang tooth cutter tool 54 is rigid in a holder 55 that is firmly mounted in a conventional lathe tool post 56 in the usual removable manner by tightening set screw 57 with a hand wrench when cutter 54 is so aligned that the work attacking ends of its cutting teeth 58 are contained in a straight row exactly parallel to the front face 41 of face plate 36 and diametrically disposed with respect to the axis of rotation of the face plate. Tool post 56 is supported on the usual sub-rest 59 atop the cross carriage 60 that rides with the main carriage 61 on lathe ways 35 toward and away from the face plate but is herein assumed to be locked to its ways 35.

Each blade blank is provided with a pivot hole 50 having an axis 31 which, as diagrammed in Fig. 4, is oblique with respect to the reference planes 28 and 30, parallel to which planes lies the course in which grooving tool 54 moves in generating the ribbed surface of the blade. In other words ridges 22 and 23 of each ribbed blade surface curve crosswise of the blade in a planar course such as indicated by reference planes 28 and 30 that slants relatively to the plane 32 of shearing movement in which the blades swing relatively to each other in the assembled shears, this plane of shearing movement being perpendicular to the pivotal axis 31.

Figure 9:
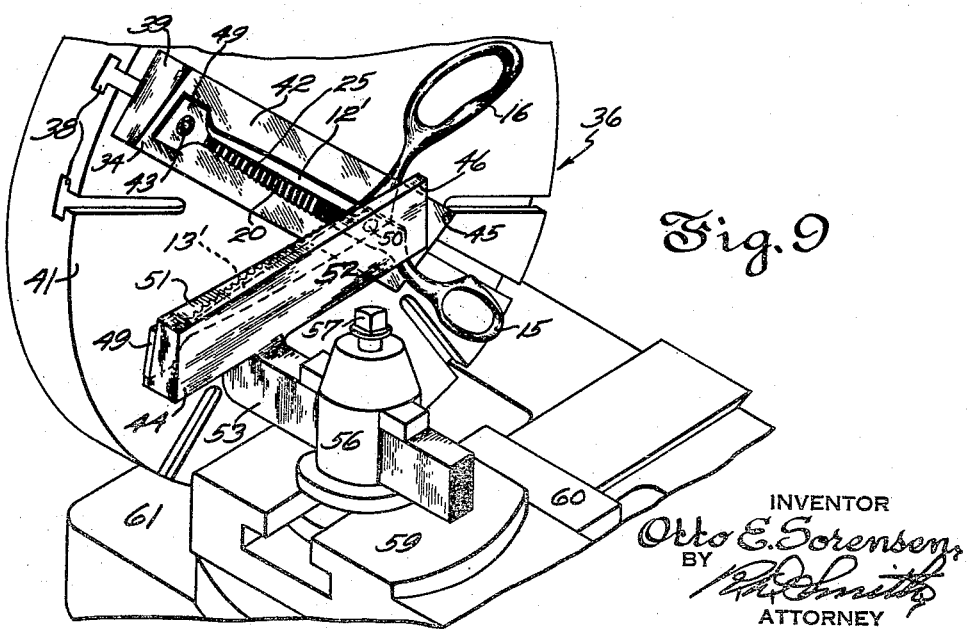
Fig. 9 is a fragmentary view comparable with Fig. 8 showing the tool set-up changed for lapping together the mating ribbed faces which have already been cut in blades of the same shears.

Fig. 9 shows the gang tooth cutter 54 and its holder 55 replaced by a different holder 53 which includes a block-like head 52 having an upstanding slanting face 51 that is parallel with the slanted face 42 of the work holding block 39 of Fig. 9 which remains as described in Fig. 8. In other words the thinnest corner 46 of holder head 52 is opposite the thickest corner 45 of block 39, while the thickest corner 44 of holder head 52 is opposite the thinnest corner 34 of block 39. The slanting head face 51 is thus adapted to carry removably the blade blank 13' after a ribbed surface has been generated in the latter in the same manner as was generated the ribbed surface of blade blank 12', except only that the ridges 23 in the ribbed surface of blade blank 13' will be spaced from the pivot hole 50 of the blade the same respective distances that the grooves 25 are spaced from the pivot hole 50 in blade blank 12'. This is accomplished by shifting the cutter 54 a half-tooth greater distance away from the center of rotation of face plate 36 when cutting the ribbed surface of blade blank 13' than when cutting the ribbed surface of blade blank 12'. The blade blank 13' is removably secured on the holder head 52 by screws similar to 43 having threaded engagement with holder head 52 so that pivot hole 50 in blade blank 13' is coaxial with pivot hole 50 in blade blank 12' when the blade blanks extend in a common direction as in closed shears. With this set-up of the mating blade blanks of shears in Fig. 9 it will be understood from Fig. 4 that the entire length of the ridges and grooves crosswise each blade blank can coincide with the entire length of the grooves and ridges, respectively, crosswise the mating blade blank inasmuch as the reference planes 28 and 30 of Fig. 4 will in Fig. 9, and in the case of both blade blanks, be parallel with the face 41 of the face plate which means perpendicular to the axis 33 of rotation of the face plate. However pivot holes 50 of each blade blank will then be slightly inclined and will "wobble" a little with respect to the said axis 33 of face plate rotation. This set-up enables the ribbed face of blade blank 13' to be positioned by the holder 53 so that its full area contacts rubbingly with the full area of the ribbed surface of blade blank 12' when the latter is swept past the former by rotary movement of the face plate. By introducing an abrasive substance between the thus rubbed together ribbed blade surfaces the entire length and full areal surface of each of ridges 22 and 23 can be lapped respectively against the entire length and full areal surface of each of grooves 24 and 25.

Figs. 10 to 14, inclusive, are explanatory of one reason for slanting blade blank holding face 42 of block 39, and blade blank holding face 51 of holder head 52, not merely crosswise such block and head as represented by full lines in the modified face 42' in Fig. 10, but also lengthwise of such block and head as is the case with face 42 shown in full lines in Fig. 11 (corresponding to the diagrammatic broken lines 42' appearing in Fig. 10 only for the sake of comparison).

Fig. 12 shows that if the blade blank is so lined up on the face plate 36 of the lathe that the straight reference line R, shown extending lengthwise of the blade in Figs. 1 and 4, intersects and is truly radial to the blade machining axis 31, then the cutting edge 20 of the blade cannot likewise be truly radial to this same machining axis 31. Remembering that the cutting edge of the tool 54, like reference line R of the blade, is truly lined up with the machining axis and that the course of the machining cut in plane 28 is inclined relatively to the plane 32, in which work severing relative movement of the blades takes place in the assembled shears, it follows that if the blade were inclined according merely to the crosswise slant of surface 42' on block 39' in Fig. 10, then the cutting edge 20 of the blade must diverge from its work severing plane of movement 32 as it is shown to do in Fig. 12. This is because there can be no coincidence between two relatively inclined planes such as 28 and 32 other than along the straight line of their mutual intersection, said straight line of intersection here being a line in diametrical relation to the axis of the machining cut. The problem thus arises as to how to generate the ridges 22 mechanically as herein disclosed and yet obtain coincidence of the blade cutting edge with the plane of its work severing movement 32 in Fig. 12.

Figs. 13 and 14 demonstrate that the lengthwise slant of blade holding surface 42 in Fig. 11, in conjunction with the crosswise slant as surface 42' in Fig. 12, solves the stated problem in that although in Fig. 12 by use of the block 39 of Fig. 11 the course of the tool movement leaves the cutting edge 20 of the blade still coincident with plane 28, as it did when cut on the block 39' of Fig. 12, nevertheless when the blade 12' springs back to the merely crosswise slanting disposition it occupies in Fig. 10 from the combined crosswise and longitudinally slanting position in which it is machined in Fig. 11, the cutting edge of the blade shifts from coincidence or parallelism with the machining plane 28 into coincidence or parallelism with the work severing plane of movement 32 of the assembled shears, this being the desired objective.

The axes 31 of the pivot holes 50 of both blades coincide in the assembled shears as represented in Figs. 6 and 7, but this common axis, further than hereinbefore explained, is inclined in lengthwise relation to the cutting edges 20 or 21 of each shear blade as indicated by angles (A) in Fig. 7. Such lengthwise inclination will be so little however as to throw the tip end of each shear blade only slightly toward the tip end of the other shear blade whereby a slight springy separative bowing of the blades is occasioned by closing the shears, thus causing a possible $\frac{1}{64}$" outward lateral displacement of the tips of each blade relatively as the shears are being closed. The temporary "give" or resilient flexure of the blade metal permits this and insures a firm rubbing together of the cutting edges 20 of the blades all along the length thereof to the extreme tips of the blades. There is thus set up a normal "toeing in" toward each other or potential rubbing interference of the blade tips when the shears are open as illustrated at 64 in Fig. 5.

I have devised an improved anti-frictional pivotal construction for thus forcing the blades to "toe in" yieldably for the purposes explained. This construction is particularly illustrated in Figs. 6 and 7 wherein the diagrammatic line 32 represents the direction of shearing motion of the blades. The flanking faces 68 of the blades in their pivotally connected region may parallel the direction in which their respective rows of linear cutting edges 20 and 21 extend. However the pivot hole 50 in each blade must align with the axis 31 that is perpendicular to the plane 32 of shearing motion. Hence each pivot hole 50 is bored in its blade with an angular degree of slant (A) relative to its blade surface which flanks the other blade and each pivot hole therefore is correspondingly slanted with respect to the direction in which the row of cutting edges 20 and 21 extends, so that the axis 31 of each pivot hole may be said to be inclined lengthwise of each shear blade. In other words, while the angles X in Fig. 6 are exactly 90 degrees, the angles Y are slightly more than 90 degrees and the angles Z slightly less than 90 degrees.

A thrust type of ball bearing 69 occupies mutually facing inner counterbores 70 in the blades whose seats 71 are parallel with each other and accommodate the thrust taking hardened race washers 72 of the ball bearing whose balls 73 are of equal size and confined to a circular path by a central cage ring 74 and by the perimeter of counterbores 70. Seats 71 constitute pivotal thrust surfaces parallel with the paths of planar swinging movement of the blades while inclined with respect to the aforesaid rows of cutting edges 20 and 21.

A similar ball bearing consisting of equal size balls 79, their centering cage ring 80, and the thrust taking hardened race washers 81 occupy an outer counterbore 82 in blade 13 under the head 83 of hollow pivot pin 84. Balls 79 are externally constrained to roll in a circular path by the perimeter of counterbore 82. A fourth and shallow outer counterbore 88 in blade 12 receives the head 89 of a thrust screw 90 that has screw engagement with the threaded interior of hollow pin 84. The extent of telescopic insertion of screw 90 within hollow pin 84 is positively limited by a loose replaceable spacer disc 91 whose ability to move toward the left in Fig. 7 is adjustably limited by a socket type of stop screw 92 lodged inside of pivot pin 84 in threaded engagement with the latter. Thus spacer disc 91 is clamped tightly between the opposed inner ends of screws 90 and 92 so that a finely adjusted distance can be established between the head 83 of pin 84 and the head 89 of screw 90 for selectively adjusting the tightness of thrust exerted by the two sets of ball bearings against the blade 13 that is sandwiched therebetween.

The novel procedure for generating the ribbed surface of my improved shear blades will for the most part be evident from the foregoing description of one illustrative form of apparatus shown in Figs. 8 to 11 that may be used. The natural order of this procedure is first to mount the block 39 on face plate 36 and then to mount blade blank 12′ on the block 39 with its pivot hole 50 at the center of rotation of the face plate and with the radial line R of the blade in Fig. 1 in diametrical alignment with the center of rotation of the face plate. The face plate may then be turned in the direction of arrow (D) in Fig. 8 and the cutter tool 54 fed gradually toward the left under finely modulated control by turning the conventional feed screw handle 66 of sub-rest 59. Thus at each revolution of the face plate more and more material can be cut from the blade blank 12′ until ridges 22 and grooves 25 have been generated therein to their full depth. Before this operation is repeated with blade blank 13′ the tool 54 will be shifted somewhat away from the center of rotation of the face plate an amount equal to the radial distance between the crest line of one ridge and the basal line of the adjoining groove. This may be done by turning the conventional feed screw handle 67 of cross carriage 60. Mating blades of a single shears having thus been machined to produce their mating ribbed surfaces, blade blank 12′ is restored to the block 39 and blade blank 13′ will be mounted on the holder head 52. By means of the screw handles 66 and 67, the ribbed surface of blade blank 13′ can now be maneuvered to such exact overall conformity in face-to-face relation to the ribbed surface of blade blank 12′ that the ridges of each blade fully occupy and meet in overall surface contact with the grooves of the mating blade. With the ribbed surface of blade blank 13′ thus urged into full rubbing contact with the ribbed surface of blade blank 12′, the latter is swung relatively to the former by the turning of face plate 36 until the full ribbed surface of each blade has been sufficiently lapped against the full ribbed surface of the other blade to completely smooth into mutual conformity the full areas of the ribbed surfaces of both blades. The two blade blanks are then removed from the machine tool, their temporary lugs 51 removed, and the blade tips bluntly pointed as in Fig. 1. After this it is only necessary to assemble the parts as shown in Fig. 7 to complete the shears ready for use.

The appended claims are directed to and intended to cover all obvious substitutes and equivalents for the particular shapes and arrangements of parts herein disclosed as shall fall within the broadest interpretation of the claim language used to define the invention.

I claim:

1. Pinking shears comprising in combination, relatively swingable work cutting blades having mutually facing ribbed surfaces each comprising alternating ridges and grooves coursing crosswise the blade in arcs of true concentric circles each ridge and groove having a profile of constant size and shape throughout the arcuate length thereof defining at the extreme ends of the ridges and grooves a continuous zig-zag cutting line along the edge of the blade, said ridges having crests confined throughout the curved length of each ridge to a common crest plane and said grooves having basal lines confined throughout the length of each groove to a root plane parallel with said crest plane, and pivot structure coupling said blades together in a manner positively constraining the blades to relative swinging movement in parallel planes of work cutting movement about a common pivotal axis of said axis being obliquely related to said parallel crest and root planes, wherefore said blades in passing can meet only at said zig-zag cutting line accompanied by clearance space at all other points between the ribbed surfaces of the blades.

2. Pinking shears as defined in claim 1, in which the said pivotal axis is oblique in such direction with respect to the said parallel crest and root planes as to direct the said cutting lines of the said blades into toed-in relationship, the said blades being sufficiently limber and resilient to flex within their elastic limit to permit said cutting lines of the blades to pass each other for shearing work.

References Cited in the file of this patent

UNITED STATES PATENTS

| Number | Name | Date |
|---|---|---|
| 489,406 | Austin | Jan. 31, 1893 |
| 545,834 | Williamson | Sept. 3, 1895 |
| 672,050 | Williamson | Apr. 16, 1901 |
| 908,969 | De Arment | Jan. 5, 1909 |
| 1,886,273 | Thompson | Nov. 1, 1932 |
| 1,903,257 | Dahl | Mar. 28, 1933 |
| 1,959,190 | Wyner | May 15, 1934 |
| 1,964,676 | Schmitz | June 26, 1934 |
| 1,965,443 | Wyner | July 3, 1934 |
| 1,970,408 | Weidauer | Aug. 14, 1934 |
| 2,000,852 | Langbein | May 7, 1935 |
| 2,268,626 | Sigoda | Jan. 6, 1942 |
| 2,284,664 | Kissling | June 2, 1942 |
| 2,286,874 | Schwartz | June 16, 1942 |
| 2,387,053 | Brown | Oct. 16, 1945 |
| 2,579,521 | Sorensen | Dec. 25, 1951 |